March 2, 1926.                                          1,575,118
                        F. L. LIPCOT
CUSHIONED CONNECTION BETWEEN THE SPRING AND AXLE OF MOTOR VEHICLES
                   Filed Nov. 13, 1923      2 Sheets-Sheet 1
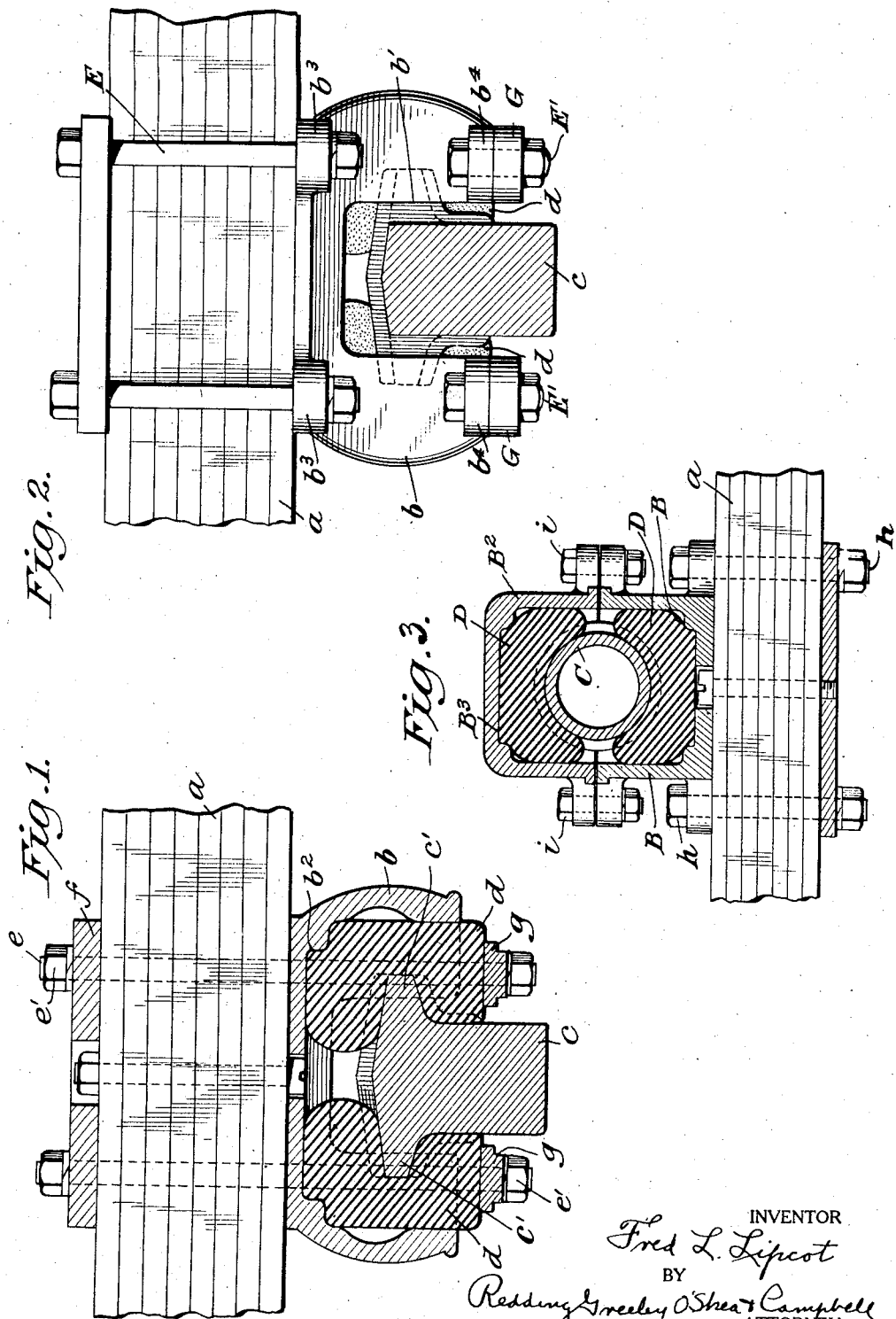

March 2, 1926.
F. L. LIPCOT
1,575,118
CUSHIONED CONNECTION BETWEEN THE SPRING AND AXLE OF MOTOR VEHICLES
Filed Nov. 13, 1923 2 Sheets-Sheet 2
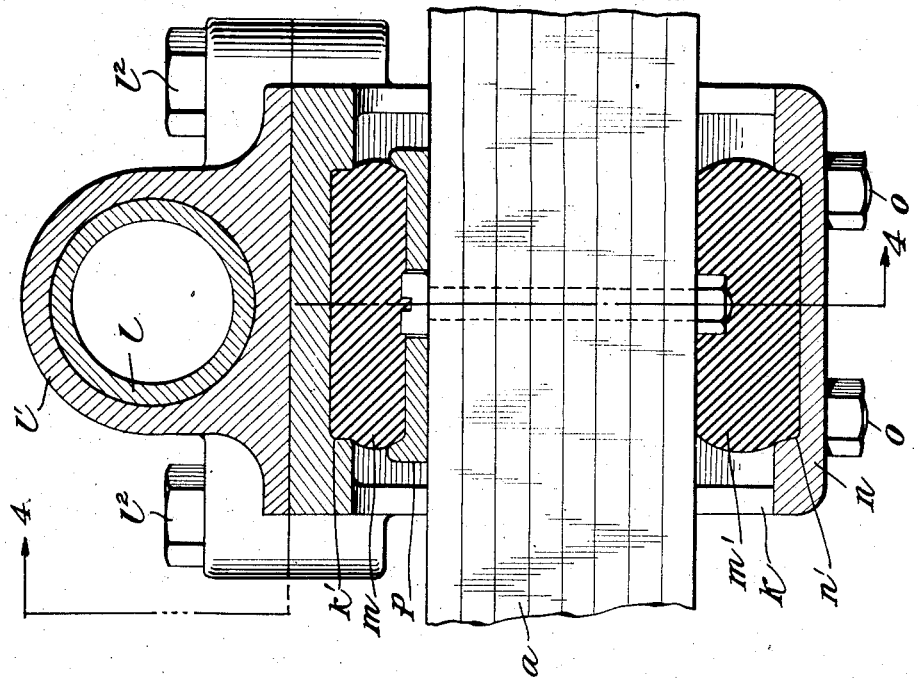
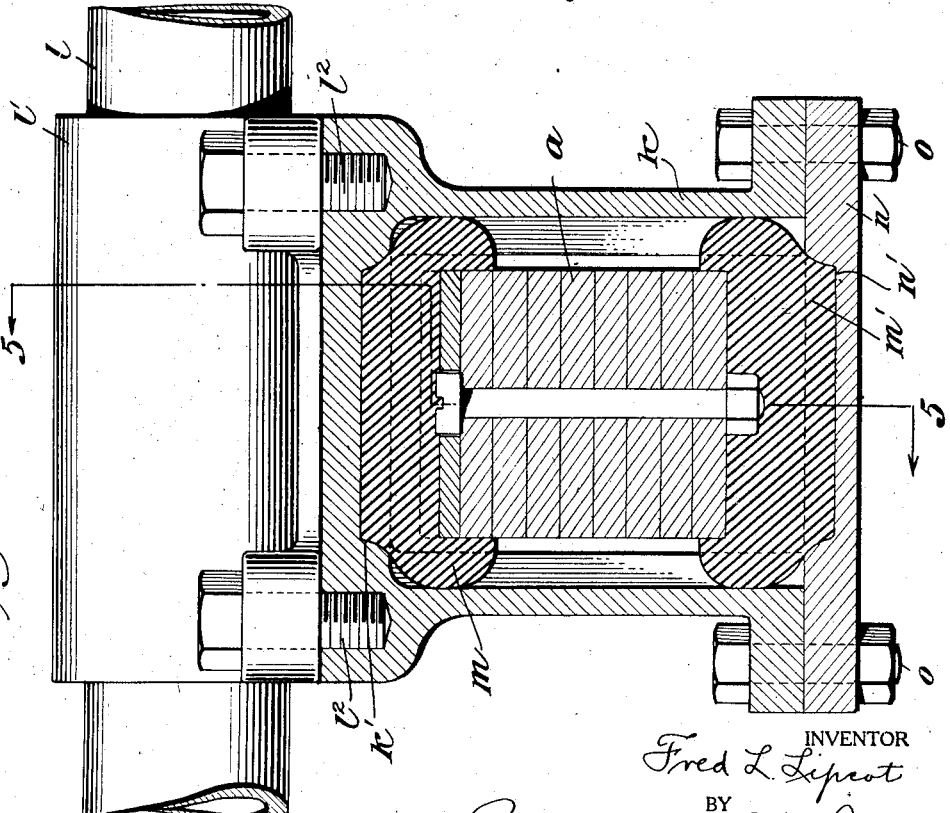
INVENTOR
Fred L. Lipcot
BY
Redding, Greeley, O'Shea & Campbell
ATTORNEYS Patented Mar. 2, 1926.

1,575,118

UNITED STATES PATENT OFFICE.

FRED L. LIPCOT, OF NEW YORK, N. Y., ASSIGNOR TO INTERNATIONAL MOTOR COMPANY, OF NEW YORK, N. Y., A CORPORATION OF DELAWARE.

CUSHIONED CONNECTION BETWEEN THE SPRING AND AXLE OF MOTOR VEHICLES.

Application filed November 13, 1923. Serial No. 674,462.

*To all whom it may concern:*

Be it known that I, FRED L. LIPCOT, a citizen of the United States, residing in the borough of Manhattan of the city of New York, in the State of New York, have invented certain new and useful Improvements in Cushioned Connections Between the Spring and Axle of Motor Vehicles, of which the following is a specification, reference being had to the accompanying drawings, forming a part hereof.

This invention relates to connections between the springs and axles of motor vehicles and is designed primarily with reference to a wholly non-metallic connection of resilient material between the mid-point of a leaf spring of conventional form and the axle. The principal object of the invention is to provide a connection of yielding non-metallic material, such as rubber, between the spring and axle which shall be of such character as to transmit mechanical stresses while eliminating all metal to metal contact. The condition resulting is a non-metallic mechanical connection as such and a yielding support between the two metal units. In the preferred form of the invention the non-metallic yielding material, which is preferably rubber, is confined under compression thereby improving its mechanical qualities and increasing the internal resilient properties. As the description proceeds it will be evident that the invention is not to be limited to the particular form of the fittings employed although it has been sought to reduce their number and simplify and cheapen their construction so far as possible while facilitating assembling and dissassembling. In the simplest form it is proposed to confine the non-metallic yielding material within a housing which is secured to one or the other of the interconnected parts while the material is maintained by said housing in engagement with the other of the parts, the assembled connection being such as to hold the non-metallic material against displacement while affording capacity for yielding movement between the axle and spring.

The invention will be described with greater particularity hereinafter in connection with the embodiments illustrated in the drawings, wherein:

Figure 1 is a view in vertical section of the improved connection as employed between a semi-elliptic leaf spring and a front dead axle of a motor vehicle.

Figure 2 is a view in side elevation of the connection shown in Figure 1, the axle being illustrated in section.

Figure 3 is a view similar generally to Figure 1 but showing the application of the connection to a tubular axle and underslung spring.

Figure 4 is a view in elevation of part of a tubular axle to which is secured the fittings for the improved connection and shows in section a leaf spring engaged directly by the non-metallic material which is supported by the axle, the section being taken on the planes indicated by the broken lines 4—4 of Figure 5 and looking in the direction of the arrows.

Figure 5 is a view in section of the parts shown in Figure 4 and taken on the planes indicated by the broken lines 5—5 of Figure 4 and looking in the direction of the arrows.

In the embodiments shown in Figures 1, 2 and 3, a leaf spring $a$ of semi-elliptic type is illustrated in each instance as carrying at its mid-section, fittings for the support of the non-metallic yielding material which is directly engaged with the axle. In Figures 4 and 5 the embodiment differs generally in this respect, that the non-metallic yielding material is engaged directly with the leaf spring while the housing in which it is supported is carried on the axle. Referring to Figures 1 and 2, for instance, the leaf spring $a$ has secured to its underside a housing $b$ which may be open at its lower end and slotted as at $b'$ in its opposite side walls to admit the axle $c$. Within the housing $b$ may be formed a seat $b^2$ for non-metallic material $d$ which itself may be molded in one or more sections, two such sections being illustrated as disposed at opposite sides of the axle $c$, and embracing it. The axle $c$ is further illustrated as provided with oppositely extending flanges $c'$ about which the material $d$ is pressed to embrace the axle snugly and prevent displacement thereof with respect to the material. For the support of the housing $b$ and for the confinement of the yielding material $d$ single bolts $e$ may be employed passing downwardly at opposite sides of the spring $a$ from the saddle $f$ and through retaining straps $g$ at opposite sides of the axle, nuts $e'$ on the bolts permitting them to be set up onto an extent sufficient to compress the material d to any desired degree and secure it firmly within the housing b on the seat $b^2$ and about the axle c and the flanges c' so that the material may not become displaced with respect to either the housing b or the axle c and the spring a is positively but yieldingly connected to the axle c through a wholly non-metallic connection and is supported yieldingly thereby so that a limited degree of relative movement therebetween is afforded and shocks and vibrations are absorbed. It has been found in practice that the compression of the material d especially when the latter is rubber, improves its mechanical properties and increases its resiliency. Further, the compression of the material causes it to flow so as to assume intimate engagement with the interconnected parts. The form shown in Figure 2 is similar to that of Figure 1 and for that reason the same reference characters have been employed in the main, the principal difference being that instead of employing the same bolts for several purposes the bolts E shown in Figure 2 pass through ears $b^3$ formed at the upper part of the housing b so as to rigidly secure the housing to the spring a and the non-metallic yielding material d is placed under compression and confined within the housing b by separate bolts E' which pass through straps G and lugs $b^4$ formed on the outer wall of the housing b.

The embodiment illustrated in Figure 3 shows an under-slung leaf spring of semi-elliptic type suspended from a tubular axle C, non-metallic yielding material D being interposed between the spring and axle so that the former is connected to and supported by the latter through a wholly non-metallic yielding connection. In the simplest embodiment a housing B is bolted to the spring a through bolts h and has formed therein a seat B' for one section of the material d which engages the axle C directly. Another section of non-metallic material D may be disposed within a cap $B^2$ for the housing B and be clamped directly onto the upper portion of the axle C, a seat $B^3$ within the cap holding this section of material against displacement. Bolts i secure the cap $B^2$ onto the housing B and permit the material D to be compressed to any desired extent best adapting it to the purpose. Relative movement between the spring and axle is permitted yieldingly.

In the embodiment shown in Figures 4 and 5 the spring a is shown as extending through the open side walls of a housing k which may be secured to an axle l through a fitting l' and securing bolts $l^2$ extending between the fitting and the housing. Within the housing is formed a seat k' for non-metallic yielding material m which engages one face of the spring and the lower end of the housing k may be closed by a cap n in which may be formed a seat n' for another section of non-metallic yielding material m' which may engage the other face of the spring. Bolts o serve as a means for securing the cap n detachably to the housing k and for adjusting the degree of compression of the non-metallic yielding material m, m', by which the spring is connected to the axle. A separate seat p for the section m of non-metallic material is illustrated as carried on the upper face of the spring a and as opposed to the seat k' within the housing k but no such seat has been shown at the underside of the spring. It will be evident that such seats may or may not be employed as may be determined. The connections and support afforded in this case are as in the other embodiments, wholly non-metallic and a limited degree of movement between the spring and axle is yieldingly permitted.

It is within the skill of a mechanic to design other appropriate fittings for supporting non-metallic yielding material at such points between the spring and axle of a vehicle as to accomplish the results described herein but all such mere alterations in design are to be considered within the scope of the invention.

What I claim is:

1. In a motor vehicle, the combination with the axle and vehicle leaf spring, of opposed seats carried with the axle and between which the spring extends, a seat carried with the spring to co-operate with the seats on the axle, separate blocks of yielding non-metallic material disposed between the seats on the axle and the spring respectively, and means to maintain said blocks under compression.

2. In a motor vehicle, the combination with the axle and vehicle leaf spring, of a housing carried with the axle and formed with opposed openings in the front and rear sides through which the leaf spring extends and an open side remote from the axle, a closure for the open side, adjustable means to secure the closure to the housing, a depressed seat formed in the housing, an opposed depressed seat formed in the closure, a seat carried with the spring formed with opposed retaining walls at the front and rear sides respectively, and co-operating with the seats in the housing, and separate blocks of yielding non-metallic material confined under compression and constrained in the longitudinal direction of the spring by the seats, said blocks being formed with cushioning portions engaging portions of the sides of the springs and the housings.

This specification signed this 9th day of November A. D. 1923.

FRED L. LIPCOT.